United States Patent [19]

Folcke et al.

[11] Patent Number: 4,723,313

[45] Date of Patent: Feb. 2, 1988

[54] VERY WIDEBAND OPTICAL SIGNAL RECEIVER

[75] Inventors: Georges Folcke, Paris; Rose Cordier, Conflans Sainte Honorine; Jean-Claude Angremy, Andresy, all of France

[73] Assignee: Alcatel, Paris, France

[21] Appl. No.: 855,257

[22] Filed: Apr. 24, 1986

[30] Foreign Application Priority Data

Apr. 25, 1985 [FR] France ................................ 85 06332

[51] Int. Cl.⁴ ............................................. H04B 9/00
[52] U.S. Cl. ................................................... 455/619
[58] Field of Search ............... 455/619, 617, 606, 607; 250/214 A, 214 AG; 330/59, 308, 311, 298, 293, 291

[56] References Cited

U.S. PATENT DOCUMENTS 2,885,495  5/1959  Sziklai et al. ................. 300/311
4,620,321 10/1986  Chown ............................ 455/619

*Primary Examiner*—Robert L. Griffin
*Assistant Examiner*—Leslie Van Beek
*Attorney, Agent, or Firm*—Sughrue, Mion, Zinn, Macpeak & Seas

[57] ABSTRACT

An optical signal receiver for operating over a very wide frequency passband having 3dB points at a few kHz and at 1 GHz or beyond, comprises an input stage (Q1, Q2), an amplifier (Q3 to Q6), an output stage (Q7), and a negative feedback resistance (R26) of one to several kilohms. In order to obtain high amplifier gain, the load resistance (R8) of the input stage is increased to the point where it sets up, together with the input capacitance, a lowpass filter pole within the receiver passband, said pole being compensated immediately thereafter by a link (10, C6) between the first and second stages (Q3 and Q4) of said amplifier.

8 Claims, 5 Drawing Figures

VERY WIDEBAND OPTICAL SIGNAL RECEIVER

The present invention relates to a receiver circuit for optical signals, said receiver being intended to operate over a very wide passband, which may extend between 3dB points situated at a few kilohertz (kHz) and at about 1 Gigahertz (GHz) or even beyond.

BACKGROUND OF THE INVENTION

Two structures are widely used at present for optical receivers in general. A first type of optical receiver structure, may be referred to as an "integrating" type structure, and is shown diagrammatically in accompanying FIG. 1. This type of structure is commonly employed at relatively low operating frequencies, e.g. up to about 100 Megahertz (MHz).

It comprises an optical receiver 1, e.g. an avalanche or PIN photodiode, associated with a load resistor 2 and an electronic amplifier 3. In order to obtain an acceptable signal to noise ratio, the resistor 2 must have a high resistance, thereby unavoidably creating, in conjunction with the input capacitance to the amplifier 3, a cutoff pole of a lowpass filter. It is therefore conventional to compensate this pole by means of an equalizer stage 4, for moving said pole above the frequency band to be transmitted. The stage 4 is conventionally constituted by a common-emitter connected transistor.

Such a circuit is not suitable for very wide band optical receivers, since it would require too high a number of equalizer stages in cascade in order to be able to operate at frequencies at or above 1 GHz. Furthermore, a circuit including a plurality of equalizer stages in cascade is very difficult to adjust, since each time an equalizer is adjusted, the immediately preceding equalizer must also be adjusted, thereby making such a circuit unsuitable for mass production. Finally, if such a circuit is to operate at high frequencies, it is incapable of transmitting low frequency service channels since it saturates at low frequencies. A last point is that such a circuit is very temperature sensitive, since it does not include any regulator means responsive to temperature.

A second conventional type of optical receiver structure may be referred to as a "transimpedance" structure, and an example is shown diagrammatically in accompanying FIG. 2. One example of a receiver of this type is the so-called "PINFET RECEIVER MODULE" sold by the American LASERTRON corporation. As shown, it comprises a photodiode 5, e.g. a PIN diode, an amplifier 6 which may comprise a field effect transistor (FET) followed by a transistor constituting a cascode type first stage, and an impedance-matching output stage comprising a common-collector connected transistor 7 using an output resistor 8. Finally, and above all, the circuit includes a negative feedback resistor 9 connected between the output from the transistor 7 and the input to the amplifier 6.

Such a transimpedance circuit operates satisfactorily up to frequencies which may be as high as several hundred MHz. Up to such frequencies it operates without any need to add an equalizer stage, and does not suffer from saturation problems at low frequencies or from bad temperature behavior, However, it is not presently known how to make such a transimpedance structure operate at very high frequencies since, with this known circuit, it is not possible to provide a negative feedback resistance 8 which is high enough, at such frequencies, to obtain an acceptable signal to noise ratio, given that the limiting feature is inadequate gain in the amplifier 6, and that it is not known how to increase this gain without increasing the number of amplifier stages to a quantity which is prohibited at such high frequencies.

It is recalled that the maximum negative feedback resistance Rmax of a transimpedance circuit is related to the gain A of its amplifier, to its stray capacitance Cp, and to the maximum frequency f to be transmitted, by an equation of the form:

$$Rmax = \frac{A + 1}{2\pi f \cdot Cp}$$

For low gain A, the value of the resistance Fmax is also low, and this means that it is not high enough to obtain a sufficiently high signal to noise ratio. By way of numerical example, for a passband of 1 GHz or or more between 3 dB points, a feedback resistance of at least one kilohm must be used, and this means that the gain A must be at least 30. Unfortunately, it is not known at present how to make an amplifier having a gain of 30 at such frequencies.

Experimental circuits currently exist which, by using very carefully selected components, manage to make do with a feedback resistance of about 600 ohms; but in order to make such a receiver operate with a passband of 1 GHz it is necessary to add common-emitter equalizer stages thereto, thereby returning to the problem of very long and difficult adjustment of said stages, and thus making this type of circuit unsuitable for large scale industrial manufacture.

Preferred embodiments of optical signal receivers in accordance with the present invention avoid the drawbacks of previously known circuits, and are capable of conveying a very wide passband, for example a passband between 3 dB points of more than 1 GHz while still being suitable for large scale industrial manufacture by virtue of the fact that no particularly long or difficult adjustment is required.

SUMMARY OF THE INVENTION

The present invention provides an optical signal receiver, of the type comprising:

a unit for transforming incident optical signals into electrical signals;

an input electronic unit having at least the function of amplifying said electrical signals;

an electronic output unit having at least an impedance-matching function;

at least one negative feedback resistance between the output from said output unit and the input to said input unit; and a very wide band multi-stage amplifier connected between said input unit and said output unit, thereby enabling said optical signal receiver to operate over a very wide frequency band having a passband between 3dB points located at a few kHz and at at least about 1 GHz;

wherein said input unit includes a load resistance whose value is such that the amplifier gain of said input unit has a value such that in conjunction with the input capacitance of said amplifier it constitutes a lowpass filter cutoff pole located in said band of frequencies;

said amplifier being equipped with at least one link between at least a first and second stage for compensating said pole, said link being constituted by a highpass filter designed to reject said pole to a frequency higher than said band of frequencies; and said negative feedback resistance having a value of at least about one kilohm and being specially disposed and implanted to have low stray capacitance.

Advantageously, said very wide band multi-stage amplifier comprises at least a first two-transistor amplifier unit of the "common collector and common base" or "paraphase" type, and said high pass filter link is placed between the first and second transistor stages of said first unit. Advantageously, said first paraphase unit is followed by a second paraphase unit of the same type.

BRIEF DESCRIPTION OF THE DRAWINGS

An embodiment of the invention is described by way of example with reference to the accompanying drawings, in which.

MORE DETAILED DESCRIPTION

Figure 3:
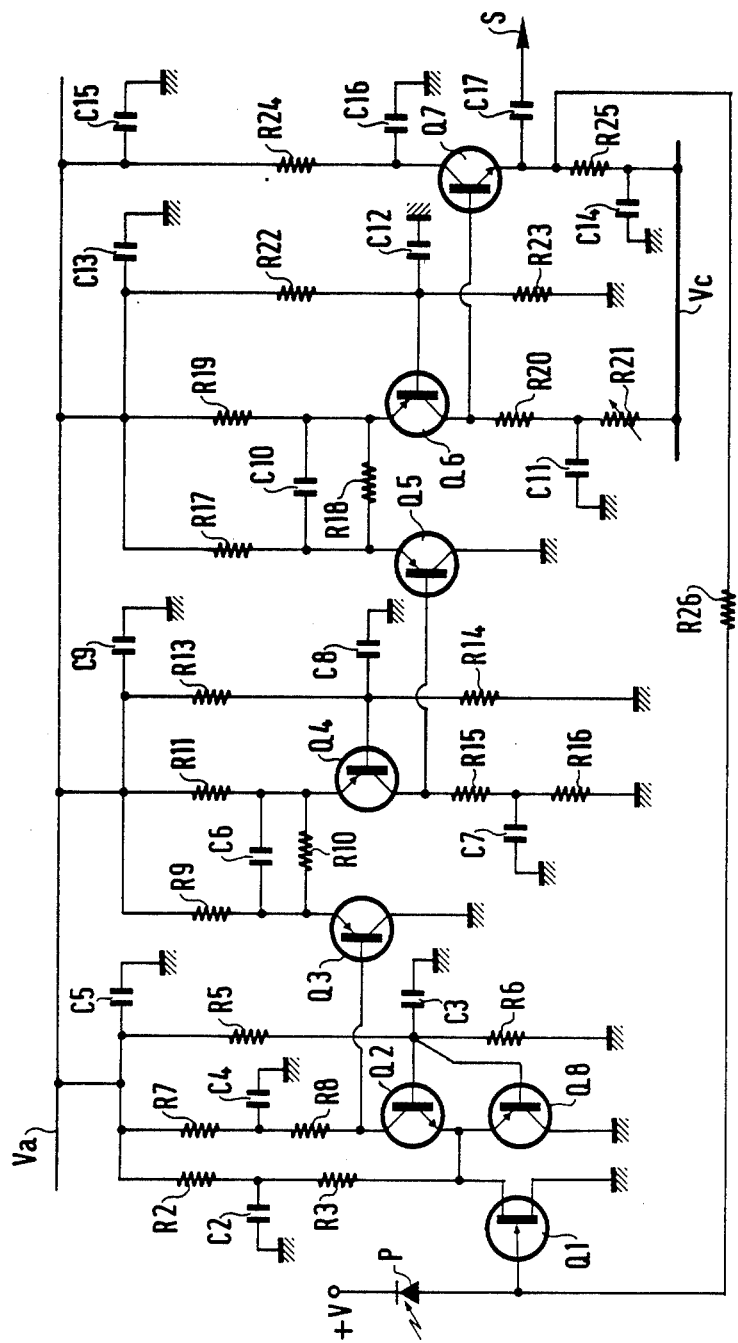
FIG. 3 is a circuit diagram of a very wide band optical receiver in accordance with the invention.

Reference is made initially to FIG. 3 which is a circuit diagram of a very wide band optical receiver in accordance with the invention. This receiver comprises following stages, in succession:

A photodiode P, e.g. an avalanche photodiode, which is biased by a DC voltage V and which transforms incident light signals into electrical signals.

An input transistor Q1, e.g. a gallium arsenide FET, whose gate is connected to the output from the photodiode P, whose source is connected to ground, and whose drain is connected to a positive DC supply Va via bias resistors R3 and R2. As can be seen in the figure, the point where the resistors R2 and R3 are interconnected is decoupled to ground via a capacitor C2 in order to avoid creating a pole of a low pass filter which would otherwise arise due to excessive resistance and to the stray capacitance of the following stage.

A second transistor Q2, e.g. an NPN transistor, connected in conjunction with the FET Q1 as a cascode stage, thereby advantageously reducing the Miller effect. The transistors Q1 and Q2 constitute the input electronic unit of the receiver. As can be seen in the drawing, the transistor Q2 has its emitter connected to the drain of transistor Q1, its base decoupled to ground by a capacitor C3 and biased by a voltage divider bridge constituted by two resistors R5 and R6 connected between the voltage Va and ground, and whose point of interconnection is connected to said base. The collector of transistor Q2 is connected to the voltage Va via two resistors R8 and R7 whose point of interconnection is decoupled to ground by a capacitor C4. The resistors R7 and R8 are the collector bias resistors of the transistor Q2, but the resistor R8 also constitutes the cascode load resistance, which resistance defines the gain of the input unit. In accordance with the invention, and in order to increase of the gain of the input unit Q1, Q2, the resistance of R8 is increased so as to constitute, together with the stray capacitance of the following stage, a cutoff pole of a lowpass filter located in the passband, for example located at several hundred MHz. For example, the resistor R8 may have a resistance of about 150 ohms.

A first wideband amplifier stage of the "common collector and common base" or "paraphase" type, constituted by a first PNP type transistor Q3 whose base is connected to the collector of the transistor Q2, i.e. to the output of the input unit (Q1, Q2), whose collector is connected to ground, and whose emitter is connected to the supply voltage Va via a bias resistor R9. Said paraphase stage also includes a second PNP type transistor Q4 whose base is decoupled to ground by a capacitor C8 and is biased, as shown, by a resistor bridge R13, R14, and whose emitter is connected to the supply voltage Va via a bias resistor R11. The connection between the emitters of transistors Q3 and Q4, i.e. between the two paraphase stages, is constituted in accordance with the invention by a parallel connected resistor R10 and capacitor C6, which are designed to provide a highpass filter pole for placing the pole created by the resistor R8 above the frequency band to be transmitted: for example R10 has a resistance of about 20 ohms, and C16 has a capacitance of a few picofarads. Finally, the emitter of transistor Q4 is connected to ground via a load resistor R15 and a bias resistor R16 whose junction point is decoupled to ground via a capacitor C7, for the same purpose of avoiding creating a pole with the input capacitance of the following stage.

A second paraphase type amplifier stage is required in this particular embodiment in order to obtain adequate gain. As shown, this stage comprises a first PNP Q5 whose base is connected to the collector of transistor Q4, whose collector is directly connected to ground, and whose emitter is connected to supply voltage Va via a load and bias resistor R17. Said paraphase stage further includes a second PNP transistor Q6. As before, the transistor Q6 has its emitter connected to the supply voltage Va via a bias resistor R19, and its base decoupled to ground via a capacitor C12 and biased by a resistor bridge R22 and R23, as shown. Its collector circuit includes a load and bias resistor R20 whose end which is not connected to the collector of transistor Q6 is decoupled to ground via a capacitor C11 and is connected to a negative DC supply voltage Vc via a variable resistance R21 whose function is explained below. The connection between the two stages Q5 and Q6 of this second paraphase is advantageously provided by a parallel connected resistor R18 and capacitor C10 which are advantageously designed to move any poles which may be due to possible stray effects to above the frequency bands to be transmitted: for example R18 and C10 may have the same values as R10 and C6, thereby constituting a highpass filter pole situated above the band to be transmitted. In this case the function of the parallel connected resistor and capacitor is solely provided by way of precaution, unlike the essential function provided by R10 and C6 of rejecting a pole which was voluntarily generated in a earlier stage.

A final conventional emitter-follower output stage comprises an NPN transistor Q7 whose base is connected to the collector of Q6, i.e. to the output from the second paraphase stage, whose collector is decoupled to ground by a capacitor C16 and is connected to the supply voltage Va by a bias resistor R24, and whose emitter is connected to the supply voltage Vc by a load and bias resistor R25. The emitter of transistor Q7 is conventionally connected to the output terminal S of the receiver via a coupling capacitor C17.

A negative feedback resistance R26 is conventionally connected between the emitter of output transistor Q7 and the gate of input FET Q1, and the value of this negative feedback resistance is greater than one kilohm, which is made possible by virtue of the high gain obtained (about 30), and it may be as much as 4 to 5 kilohms.

It is essential for proper operation of a receiver in accordance with the invention firstly to ensure that the power supply is thoroughly decoupled, and this is achieved, as shown, by the decoupling capacitors C5, C9, C13, and C14; and secondly to ensure that the FET Q1 is adequately protected when the receiver is switched on. This startup protection is provided, in accordance with the invention, firstly by means of a startup transistor Q8 which is a PNP type transistor connected in parallel with the FET Q1 to short circuit it during turnon, and secondly by the variable resistance R1 which is set to a high value during turnon and which is subsequently reduced in value progressively by hand so as to apply the bias voltage to the gate of FET Q1 by degrees.

Finally, when performing the invention, it is important for the negative feedback resistance R26 to be constructed and implanted in such a manner as to have as low a stray capacitance as possible, given that the entire circuit shown in FIG. 3 is naturally designed as a function of the very high frequencies that it is to pass. For example, R26 may be constructed by micro-assembly using hybrid components, as is conventional for the person skilled in the art.

Figure 1:
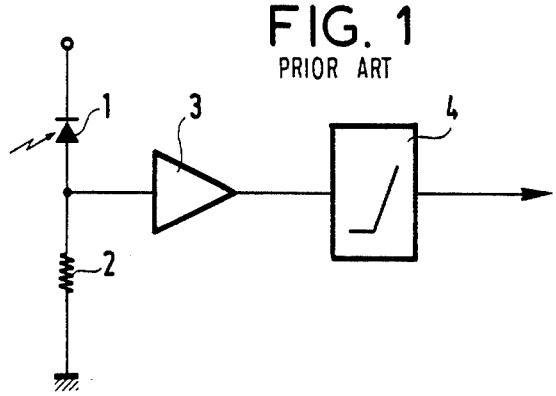
FIG. 1 is described above and is a diagram of a prior art "integrating" optical receiver.
Figure 2:
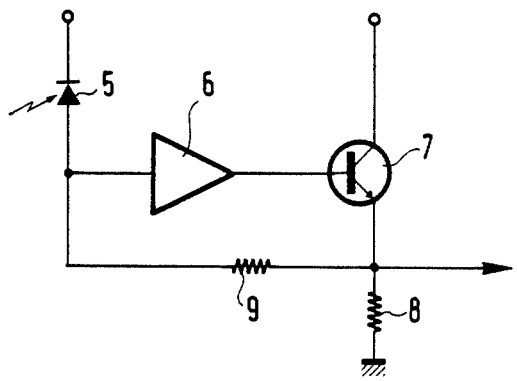
FIG. 2 is described above and is a diagram of a prior art "transimpedance" optical receiver.
Figure 4:
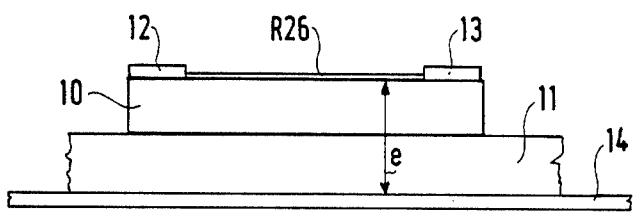
FIG. 4 is a side view showing how the negative feedback resistance shown in FIG. 3 is implanted.
Figure 5:
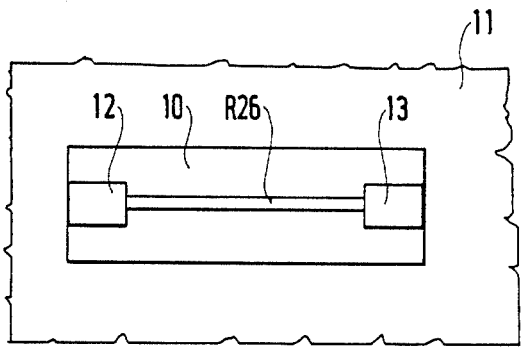
FIG. 5 is a plan view showing how the negative feedback resistance of FIG. 3 is implanted.

FIGS. 4 and 5 are diagrams showing one embodiment of a suitably implanted negative feedback resistance R26 in accordance with the invention.

This resistance is made in the form of a narrow and very elongate layer deposited on a first alumina substrate 10 which is itself glued to the insulating substrate 11 which supports the entire receiver circuit. A grounded metal sheet 14 is conventionally glued beneath the substrate 11. The distance e between the resistance R26 and ground is thus about 1.5 to 2 millimeters, thereby ensuring that its stray capacitance is very low. As shown, the resistance 26 is terminated by two wide connection terminals 12 and 13.

We claim:

1. An optical signal receiver, of the type comprising:
   a unit for transforming incident optical signals into electrical signals;
   an input electronic unit having at least the function of amplifying said electrical signals;
   an electronic output unit having at least an impedance-matching function;
   at least one negative feedback resistance between the output from said output unit and the input to said input unit; and
   a very wide band multi-stage amplifier connected between said input unit and said output unit, thereby enabling said optical signal receiver to operate over a very wide frequency band having a passband between 3 dB points located at a few kHz and at at least about 1 GHz;
   wherein said input unit includes a load resistance whose value is such that the amplifier gain of said input unit has a value such that in conjunction with the input capacitance of said amplfier it constitutes a lowpass filter cutoff pole located in said band of frequencies;
   said amplifier being equipped with at least one link between at least a first and second stage for compensating said pole, said link being constituted by a highpass filter designed to reject said pole to a frequency higher than said band of frequencies; and
   said negative feedback resistance having a value of at least about one kilohm and being specially disposed and implanted to have low stray capacitance.

2. An optical signal receiver according to claim 1, wherein said very wide band amplifier includes at least a first input unit of the common collector and common base type, said link being placed between the first stage and the second stage of said unit.

3. A receiver according to claim 2, wherein said first common collector and common base type unit is followed by a second unit which is also of the common collector and common base type.

4. A receiver according to claim 3, wherein said second paraphase type unit comprises two stages which are interconnected by a link constituting a highpass filter having its pole situated above the frequency band to be transmitted.

5. A receiver according to claim 1, wherein said electronic input unit comprises an input field effect transistor (FET) and a circuit for protecting said FET when said receiver is turned on.

6. A receiver according to claim 5, wherein said circuit for protecting said FET includes a transistor connected in parallel therewith.

7. A receiver according to claim 5, wherein said circuit for protecting said FET includes a device for gradually applying the power supply voltage to the FET.

8. A receiver according to claim 6, wherein said circuit for protecting said FET includes a device for gradually applying the power supply voltage to the FET.

* * * * *